Figure 1:
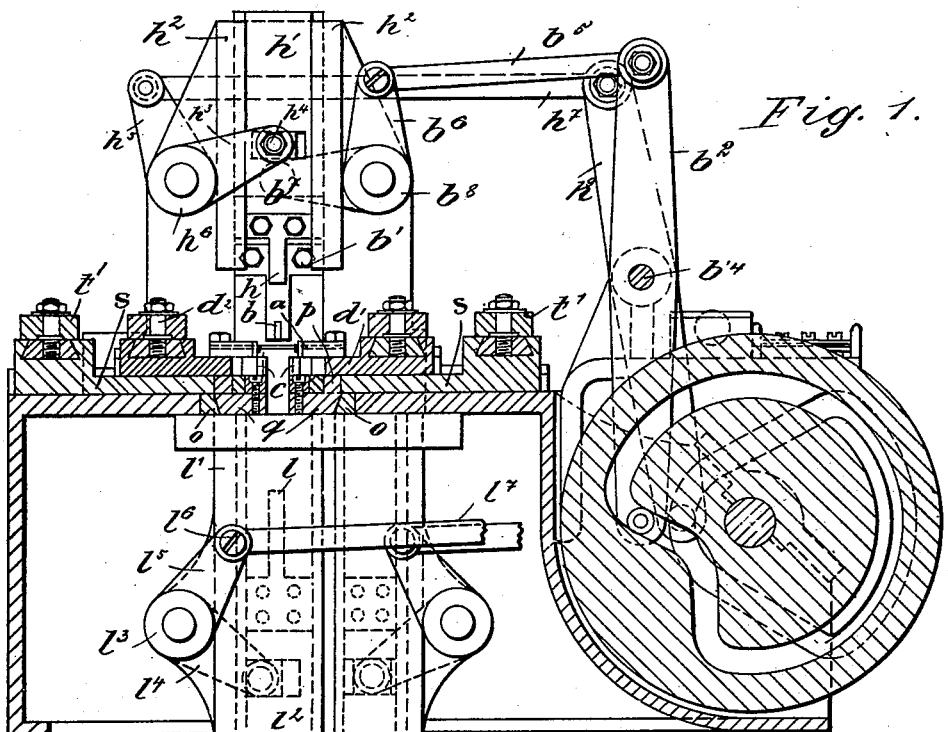

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 1.

WITNESSES:
Fred White
René Bruine

INVENTOR:
Friedrich Wilhelm Wesner,
By his Attorneys

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 2.
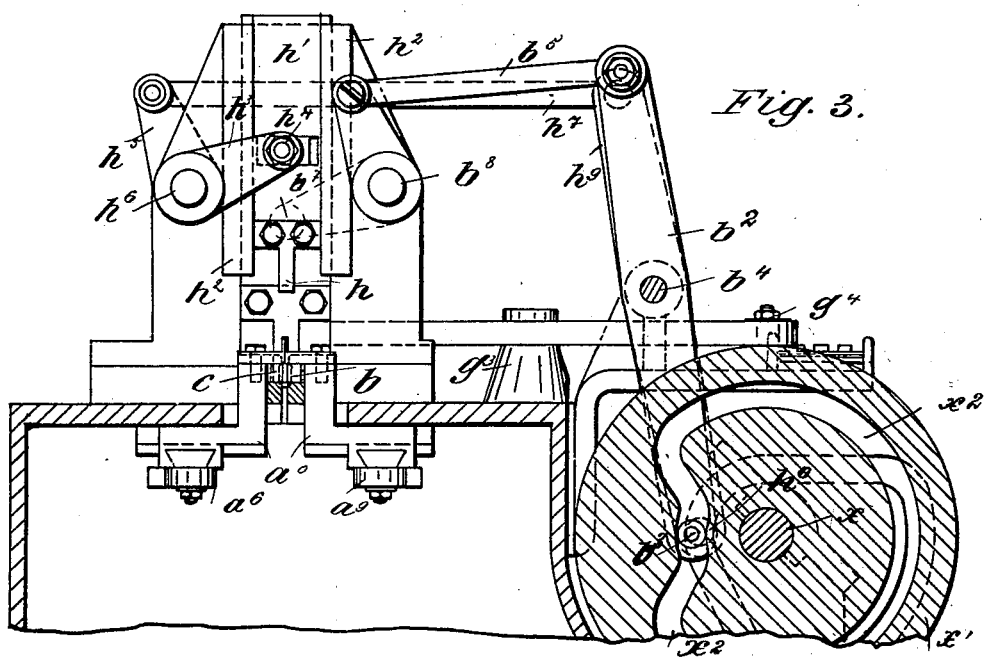
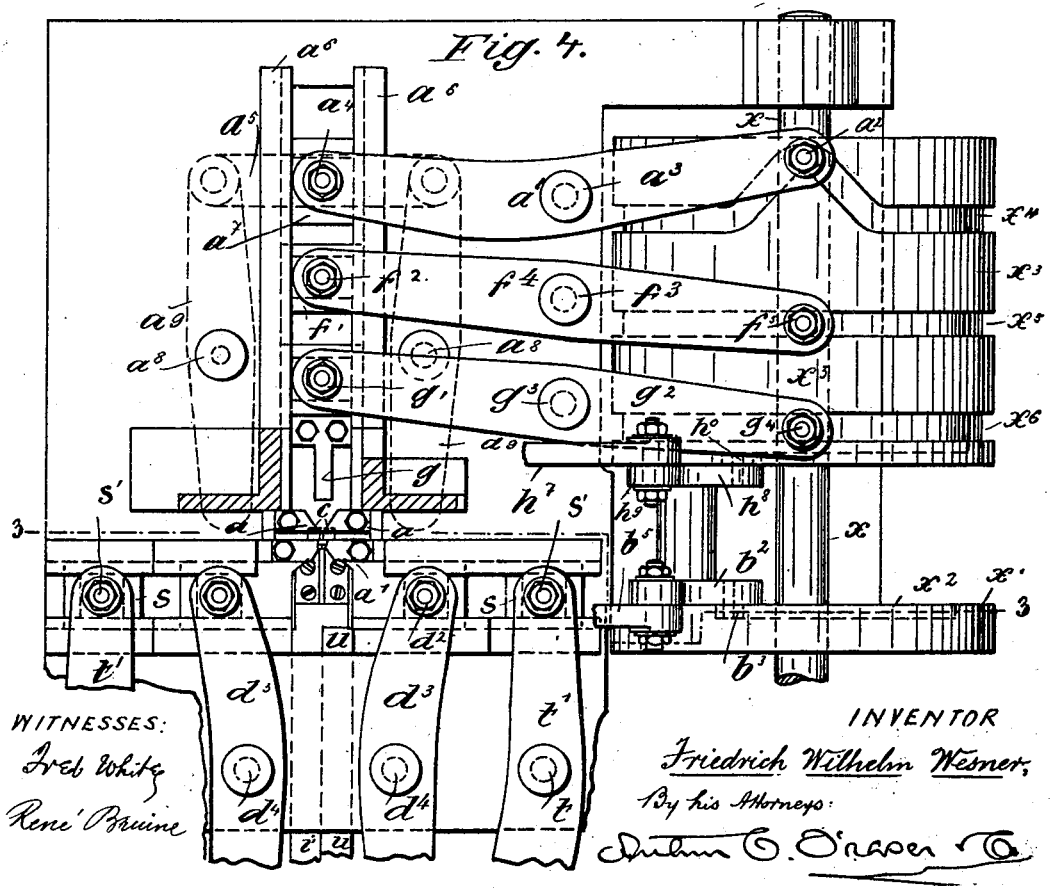
WITNESSES:
Fred White
René Bruine
INVENTOR
Friedrich Wilhelm Wesner,
By his Attorneys No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 3.

WITNESSES:

INVENTOR:
Friedrich Wilhelm Wesner,
By his Attorneys

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 4.

WITNESSES: INVENTOR:
Fred White Friedrich Wilhelm Wesner,
René Bruine By his Attorneys No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 5.

WITNESSES
Fred White
René Bruine

INVENTOR:
Friedrich Wilhelm Wesner,
By his Attorneys:
Arthur C. Fraser & Co.

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 6.

WITNESSES
INVENTOR:
Friedrich Wilhelm Wesner,
By his Attorneys

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 8.

WITNESSES:
INVENTOR
Friedrich Wilhelm Wesner,
By his Attorneys

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 9.

WITNESSES: Fred White, René Bruine

INVENTOR: Friedrich Wilhelm Wesner,
By his Attorneys:

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 10.
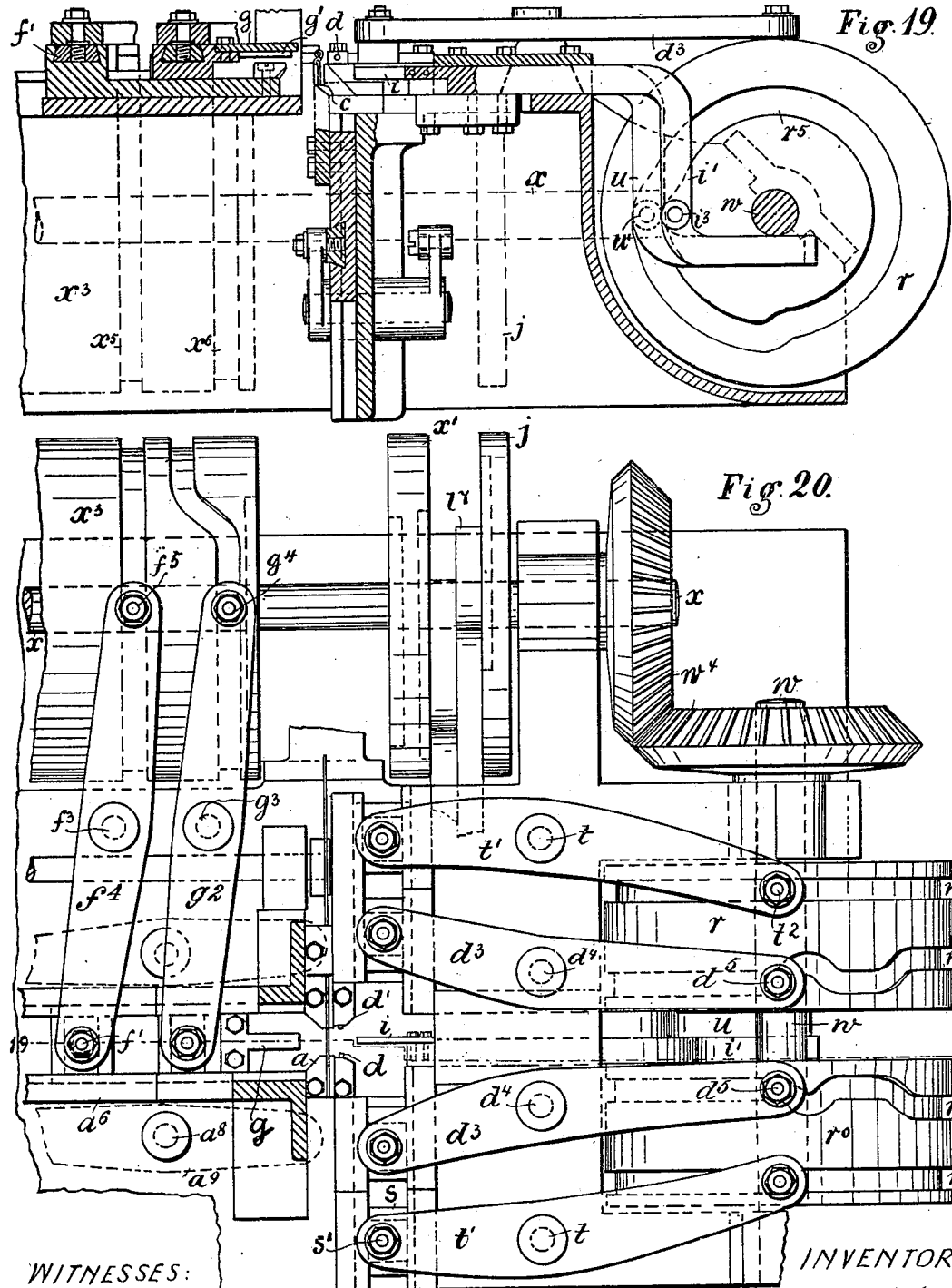

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 11.
Fig. 19.ª
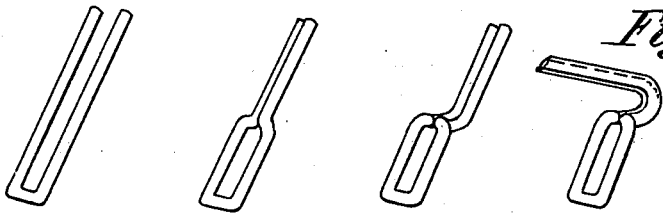
Fig. 21.  Fig. 22.  Fig. 23.
Fig. 24.
Fig. 25.  Fig. 26.  Fig. 27.
WITNESSES:
INVENTOR·
Friedrich Wilhelm Wesner,
By his Attorneys

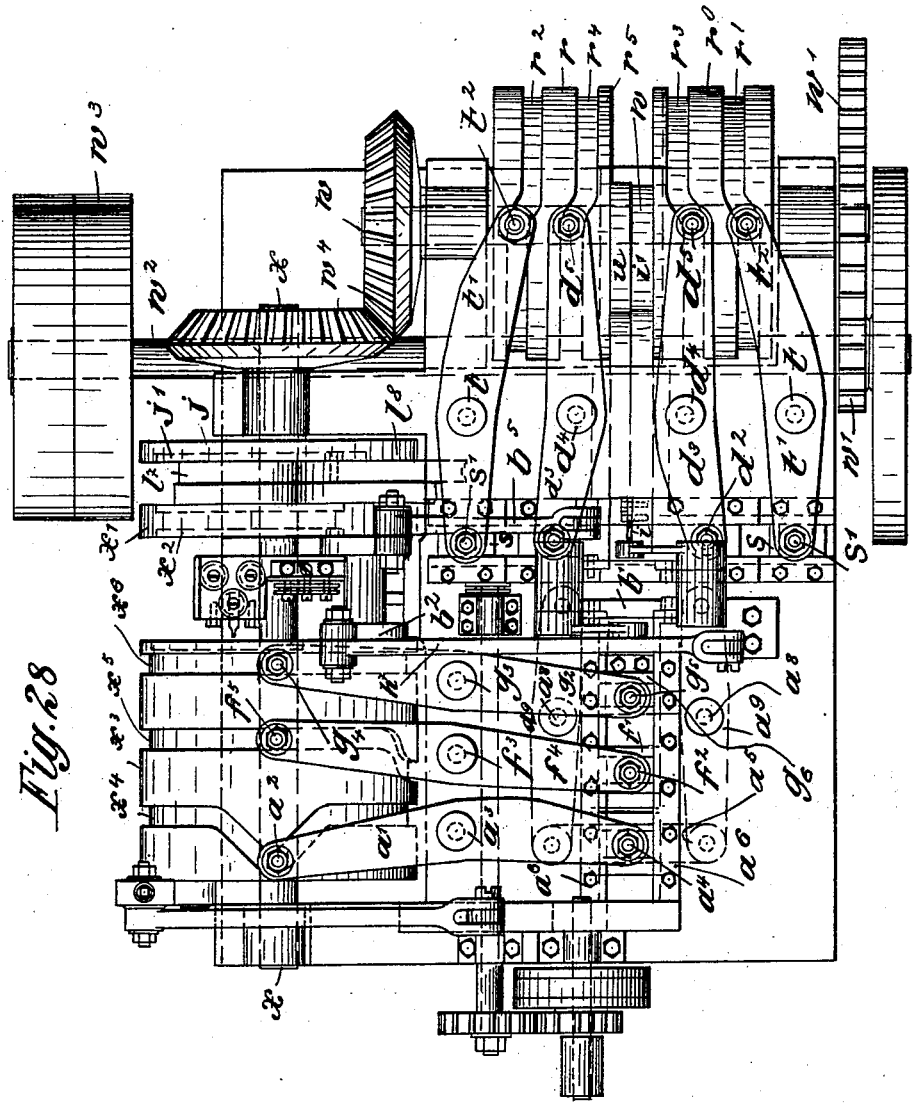

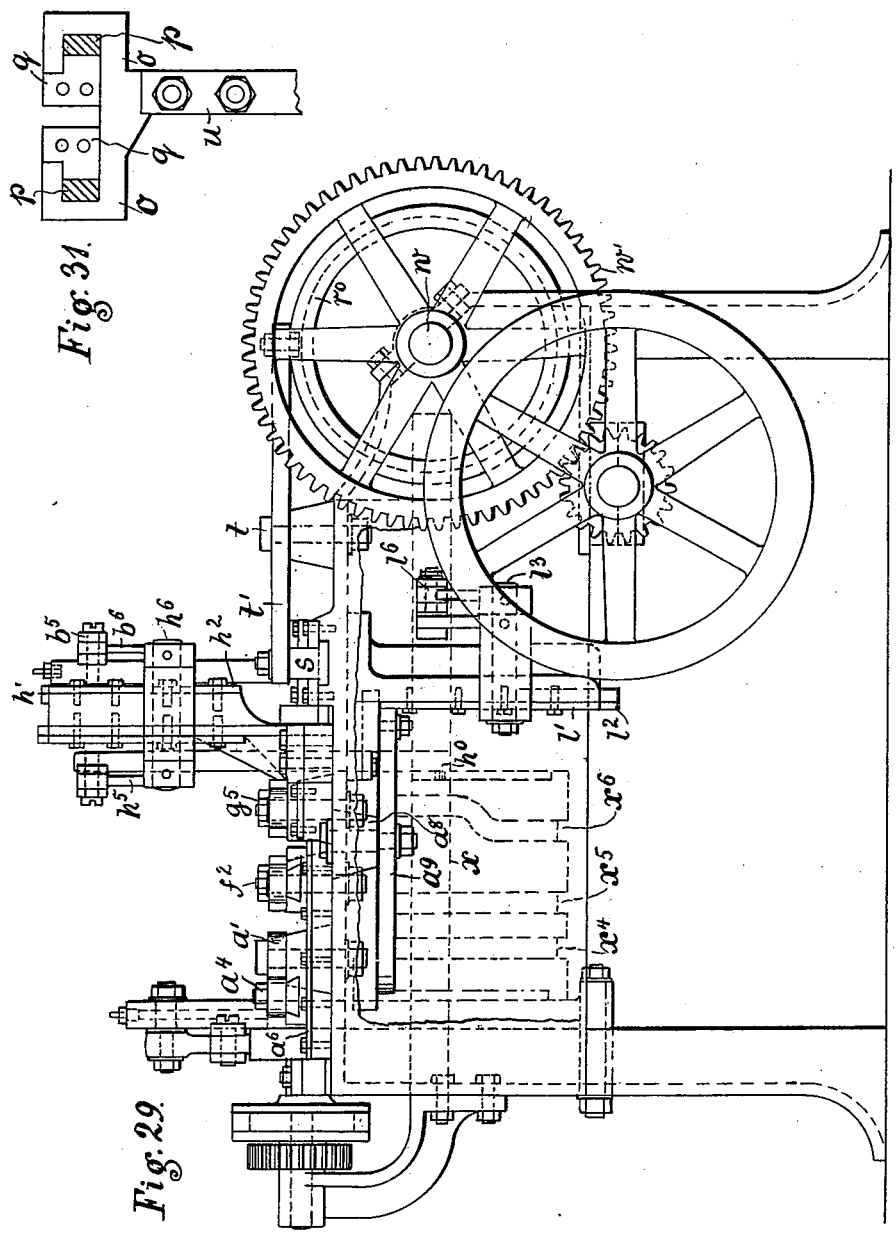

No. 665,710. Patented Jan. 8, 1901.
F. W. WESNER.
MACHINE FOR MAKING WIRE CHAINS.
(Application filed Dec. 29, 1899.)
(No Model.) 15 Sheets—Sheet 14.
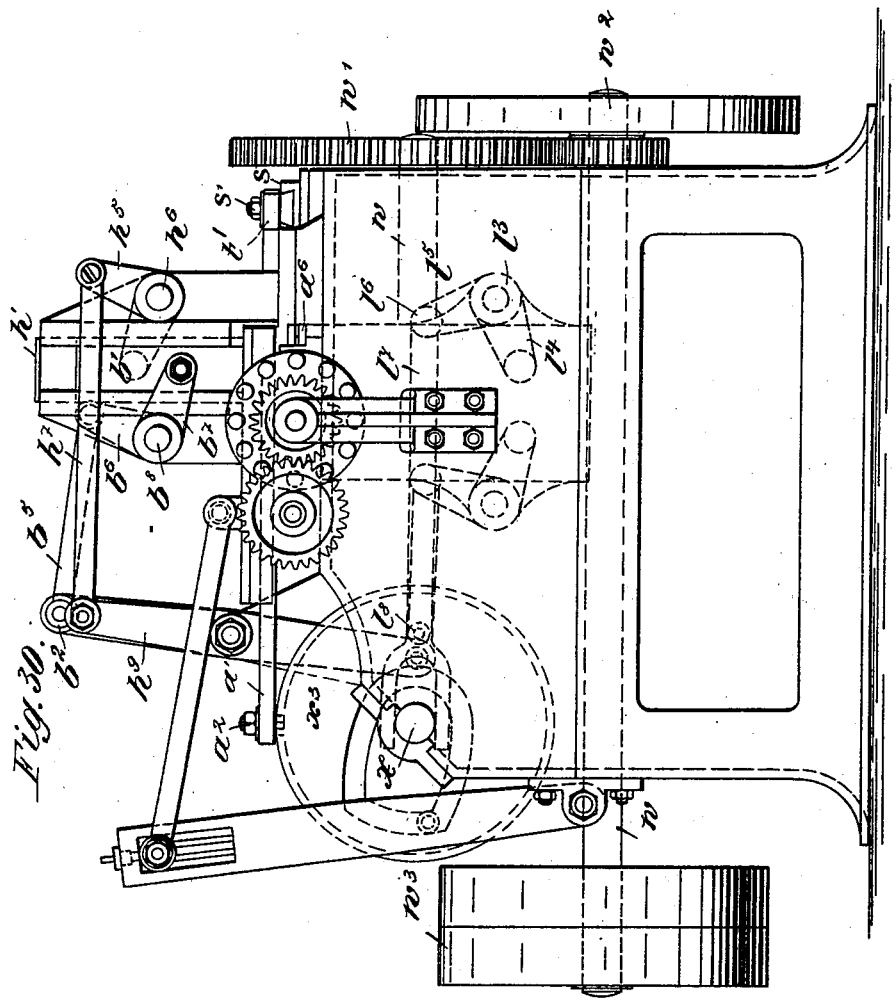
WITNESSES:
Fred White
Rene Bruine
INVENTOR:
Friedrich Wilhelm Wesner
By his Attorneys
Arthur G. Draper & Co.

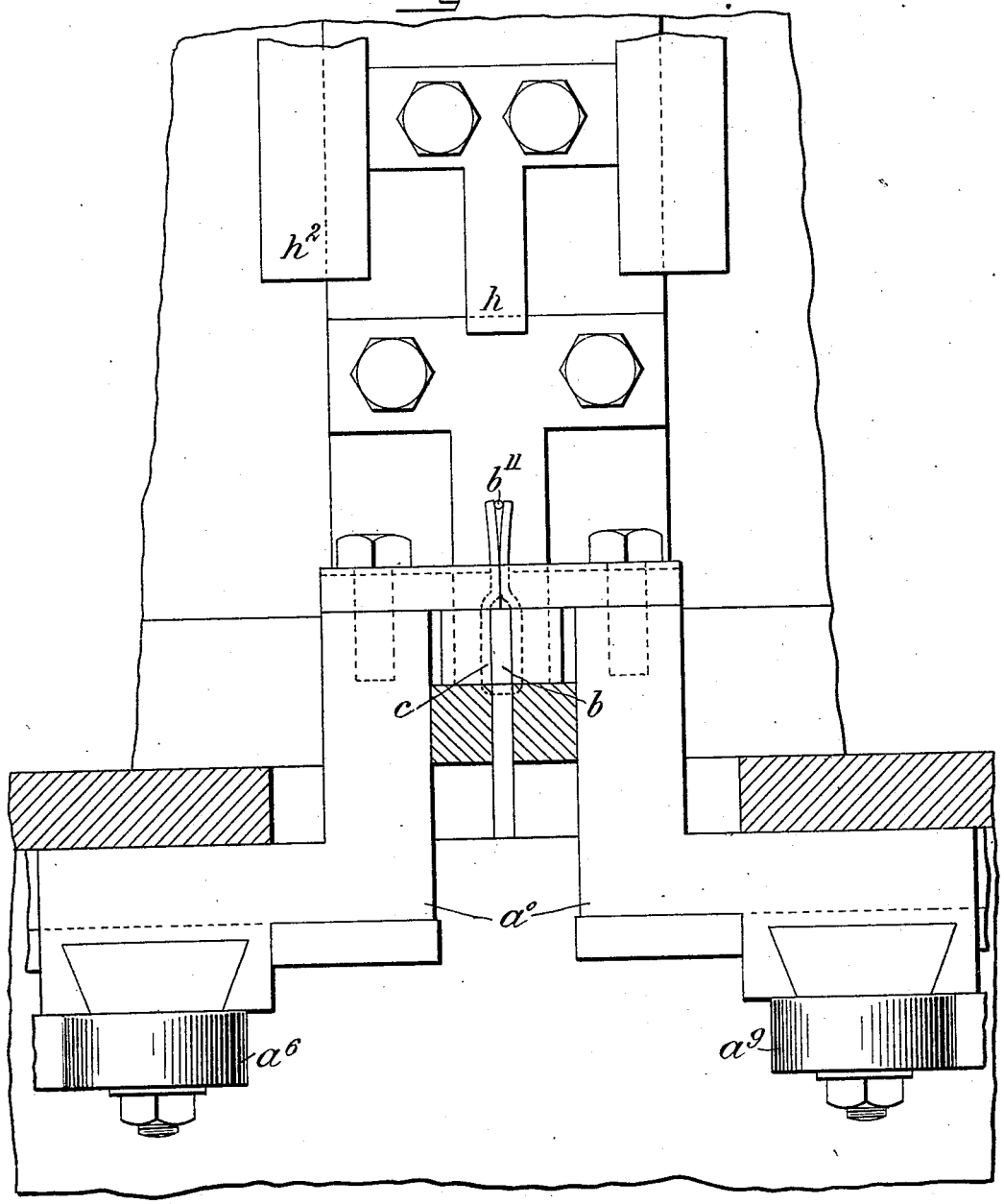

UNITED STATES PATENT OFFICE.

FRIEDRICH WILHELM WESNER, OF CHARLOTTENBURG, GERMANY.

MACHINE FOR MAKING WIRE CHAINS.

SPECIFICATION forming part of Letters Patent No. 665,710, dated January 8, 1901.

Application filed December 29, 1899. Serial No. 742,006. (No model.)

*To all whom it may concern:*

Be it known that I, FRIEDRICH WILHELM WESNER, engineer, a subject of the King of Prussia, German Emperor, residing at Charlottenburg, in the German Empire, have invented certain new and useful Improvements in Machines for Making Wire Chains; and I do hereby declare the following to be full, clear, and exact description of the invention, such as will enable others skilled in the art to which it appertains to make and use the same.

This invention relates to a machine for making chains from wire, and especially to such machines in which the single parts or links of the chain are formed from pieces of wire which are first bent to U shape and then inwardly to form abrupt shoulders, around which the ends are twisted in forming the eyes.

Chains formed by machines now in use have the disadvantage that the eyes of the links are not close enough together and that the links have a circular or oval shape and are disproportionately broad. On loading the chain or otherwise putting it under strain the eyes give way, so that they press against each other, thus gripping deeper into the curve of the next part, and thereby causing a lengthening or stretching of the whole chain. The free ends of the wire are exposed and the chain has the disadvantage that rough fibers remain attached to it, and that consequently in handling the chain feels rough and sharp-pointed. It has been found in using such chains for chaining up animals that hair catches between the wire ends. The excessive breadth of such chains spoils their appearance, requires more material, and reduces the strength of the same. These defects make such chains of little value for agricultural purposes and too expensive to produce on account of the excess of material used, while for technical purposes they can only be used in exceptional cases. All these drawbacks have been overcome by my invention, thereby opening a large field for wire chains for agricultural and technical purposes. The main features consist in the great strength and exactness of each link of the chain, its small weight, and its inconsiderable breadth. By my invention the first-named drawback is done away with in that after bending the wire into U shape and before the completion of the eyes I form the two sides or legs with an abrupt inward bend or curve at that part where the eyes are to be formed, thus bringing the ends which are to form the eyes close together, whereby the eyes when formed touch each other closely. The second drawback is done away with by bending the outer wire ends into the eyes. Other disadvantages are overcome by forming the lower curve of the loop of the chain-link to correspond with the two eyes of the adjoining link, so that the sides of the loop may remain as straight as possible. Further, these disadvantages are overcome by forming the windings of the eyes in the bends close together, so that the chain has a width substantially equal to a fourfold thickness of the wire.

Figure 2:
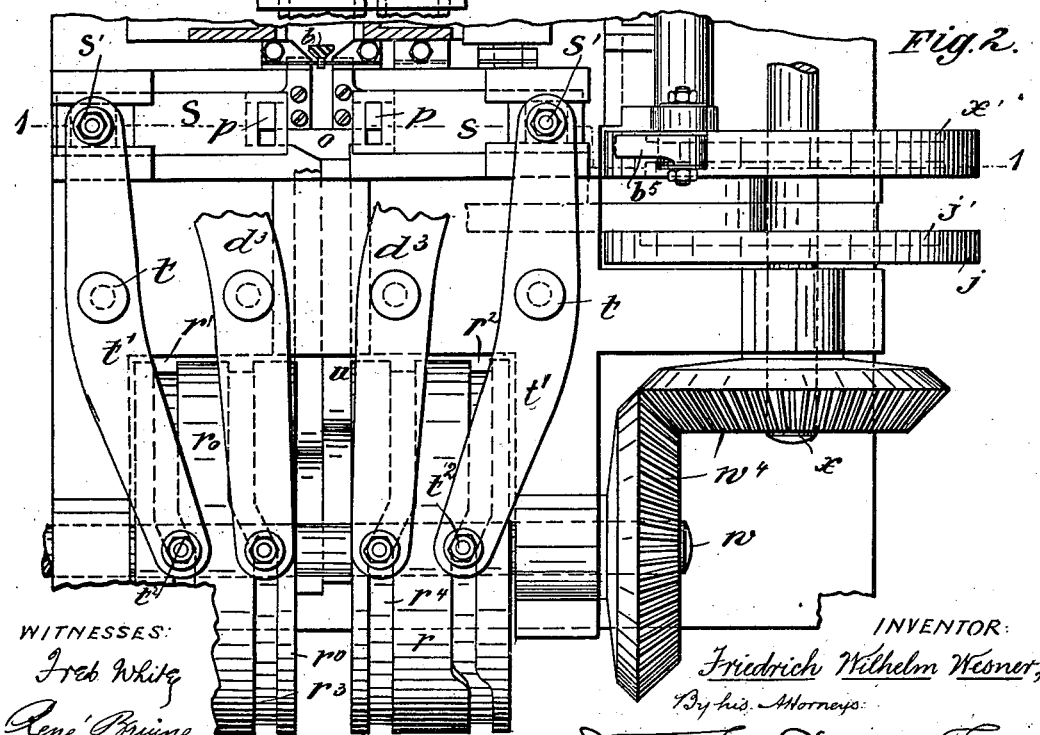
Figure 5:
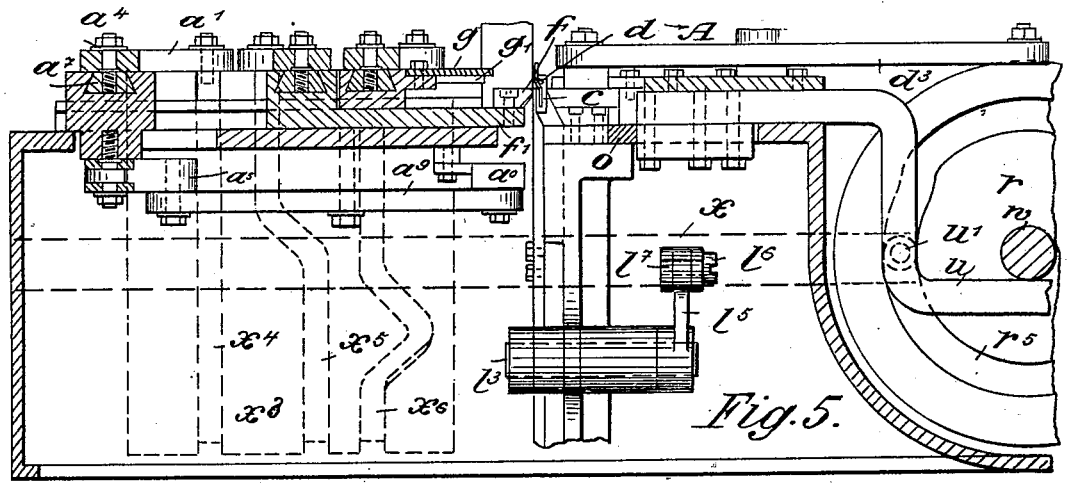
Figure 6:
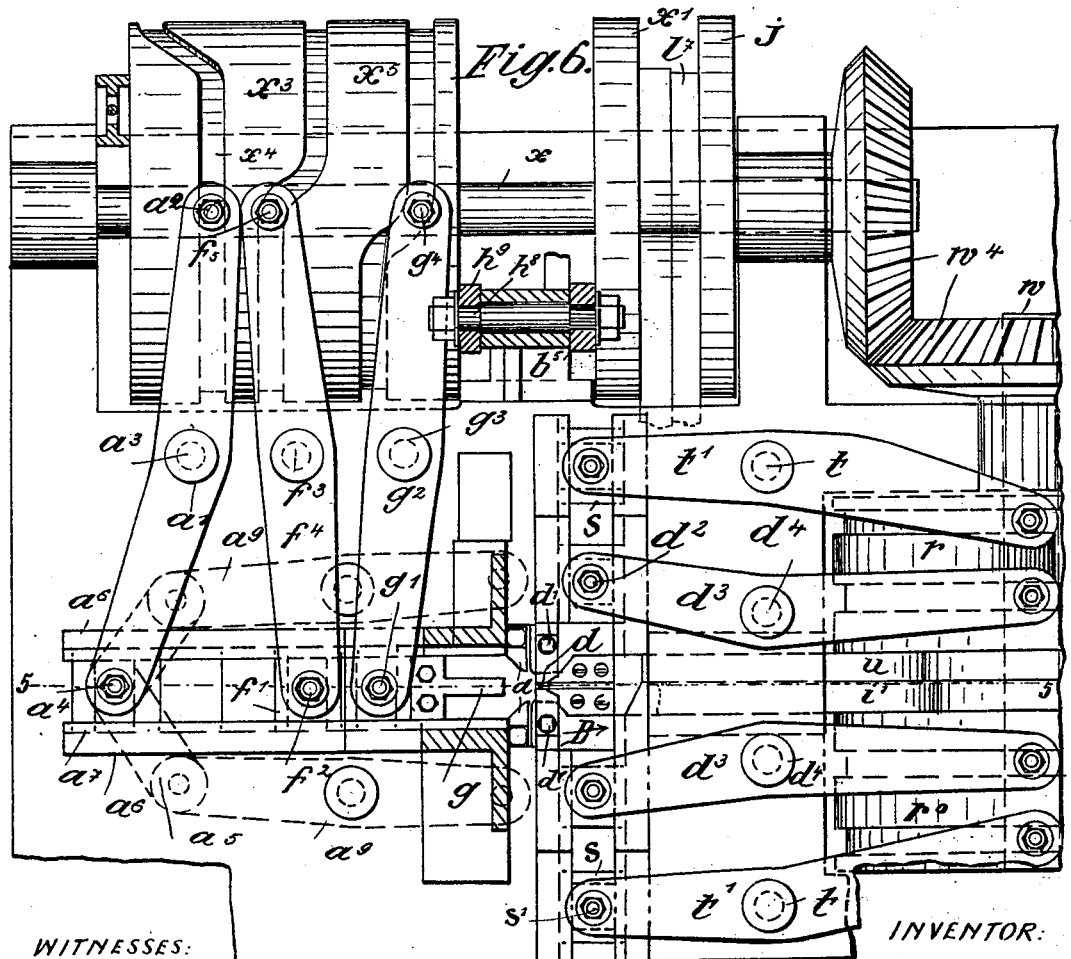
Figure 7:
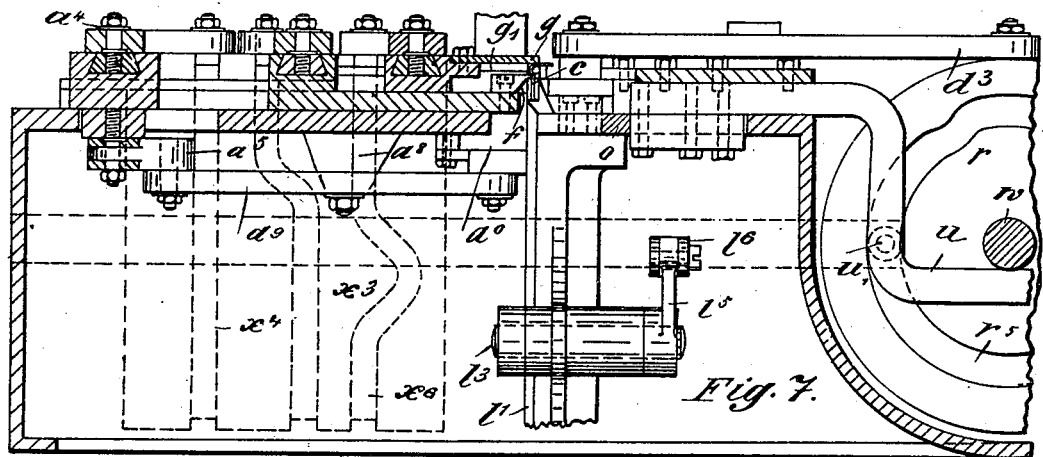
Figure 8:
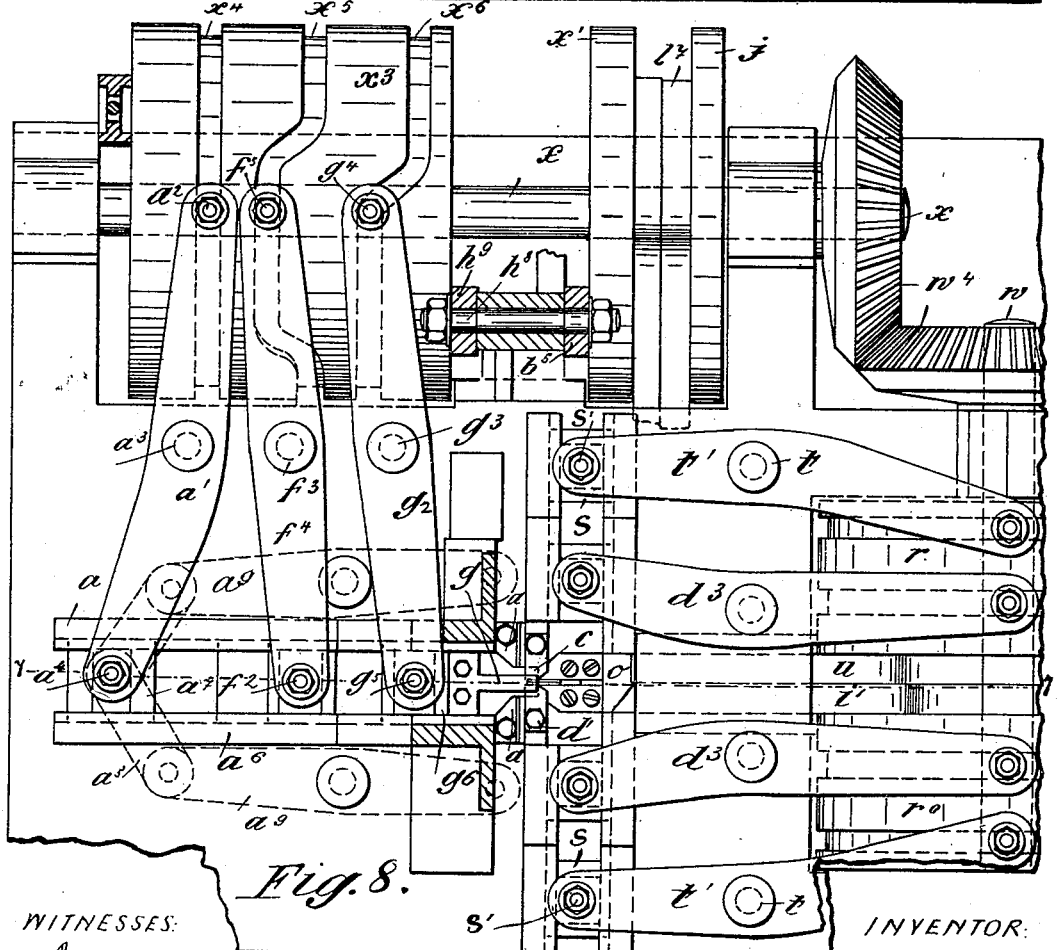
Figure 9:
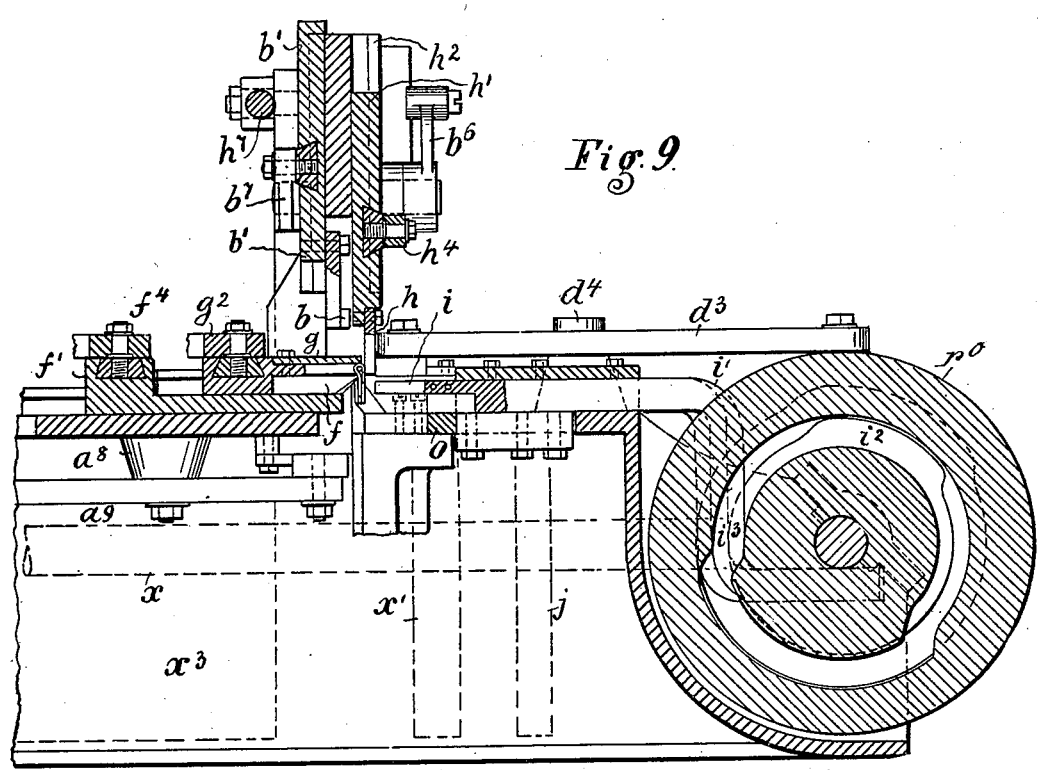
Figure 10:
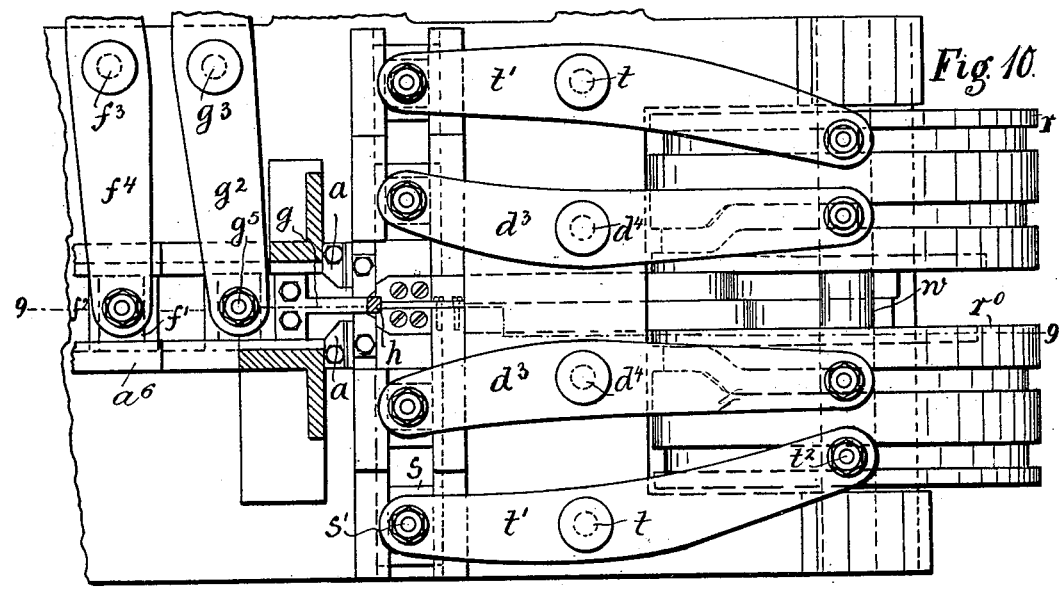
Figure 11:
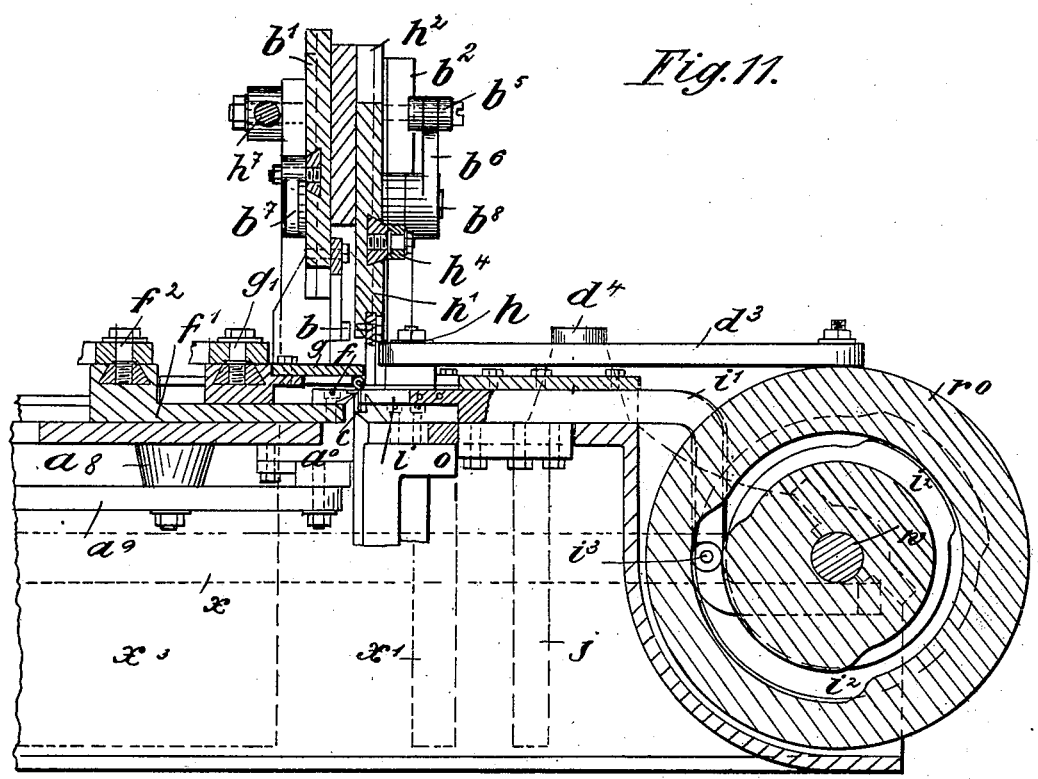
Figure 12:
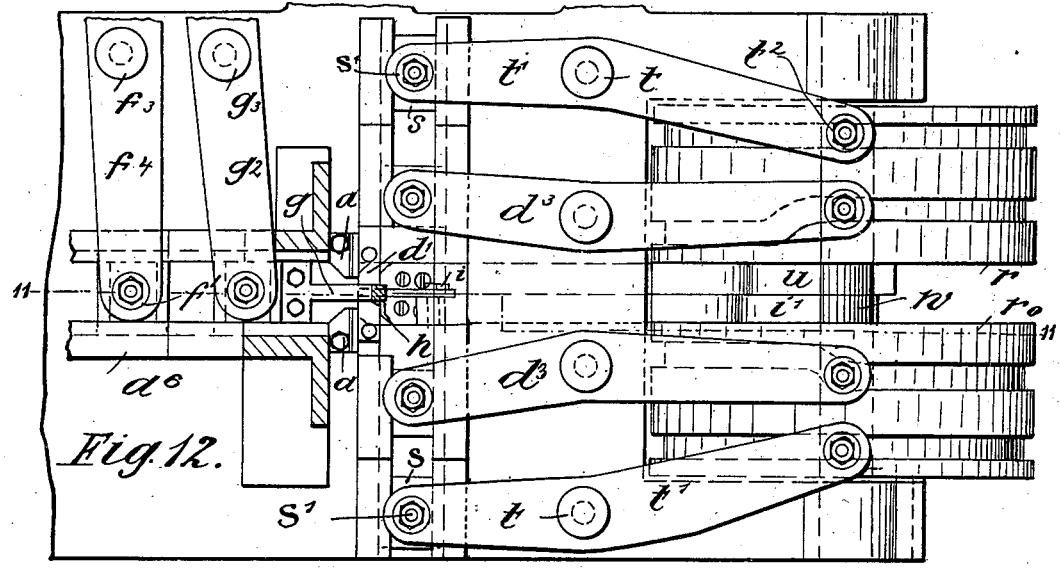
Figures 13, 14:
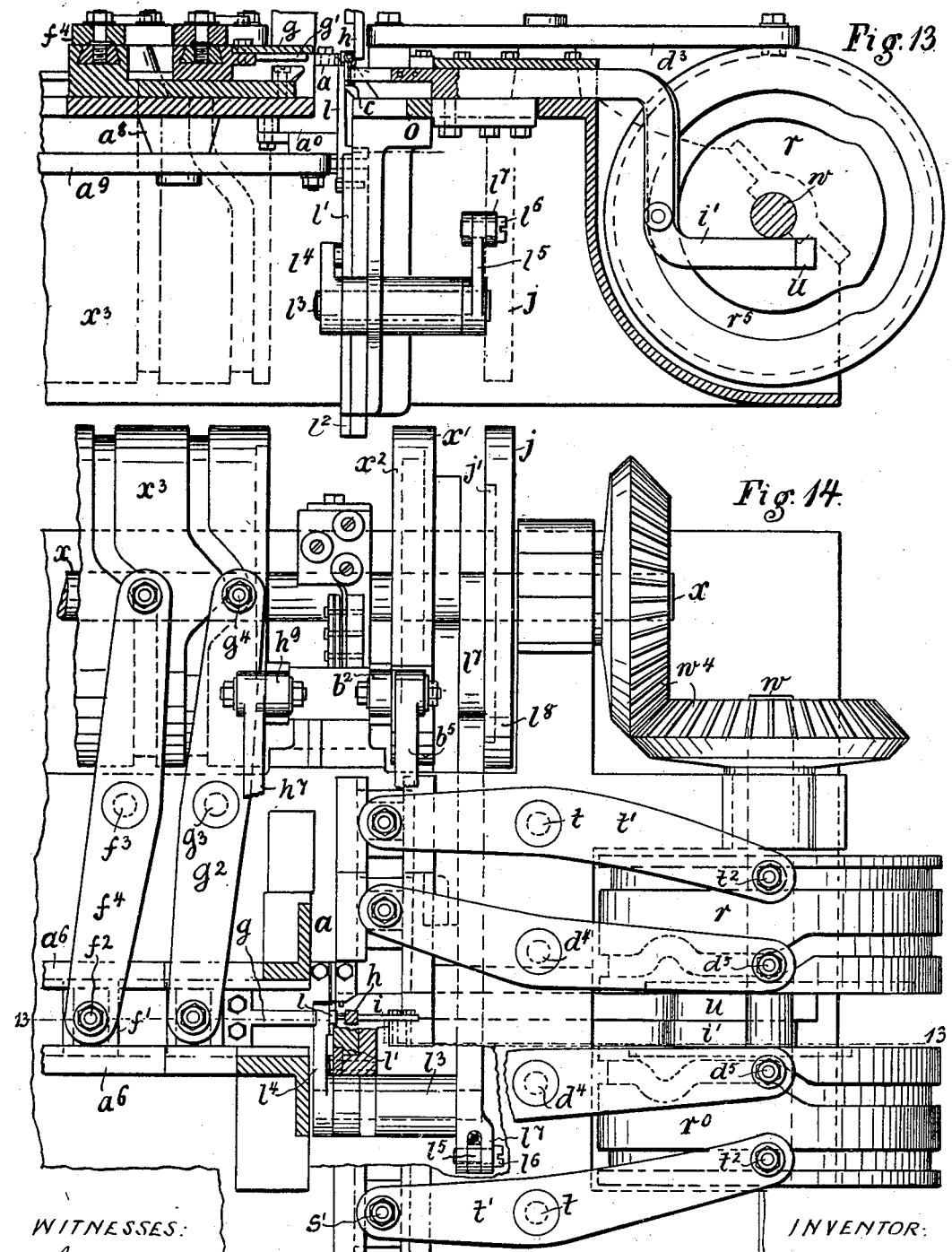
Figures 15, 16:
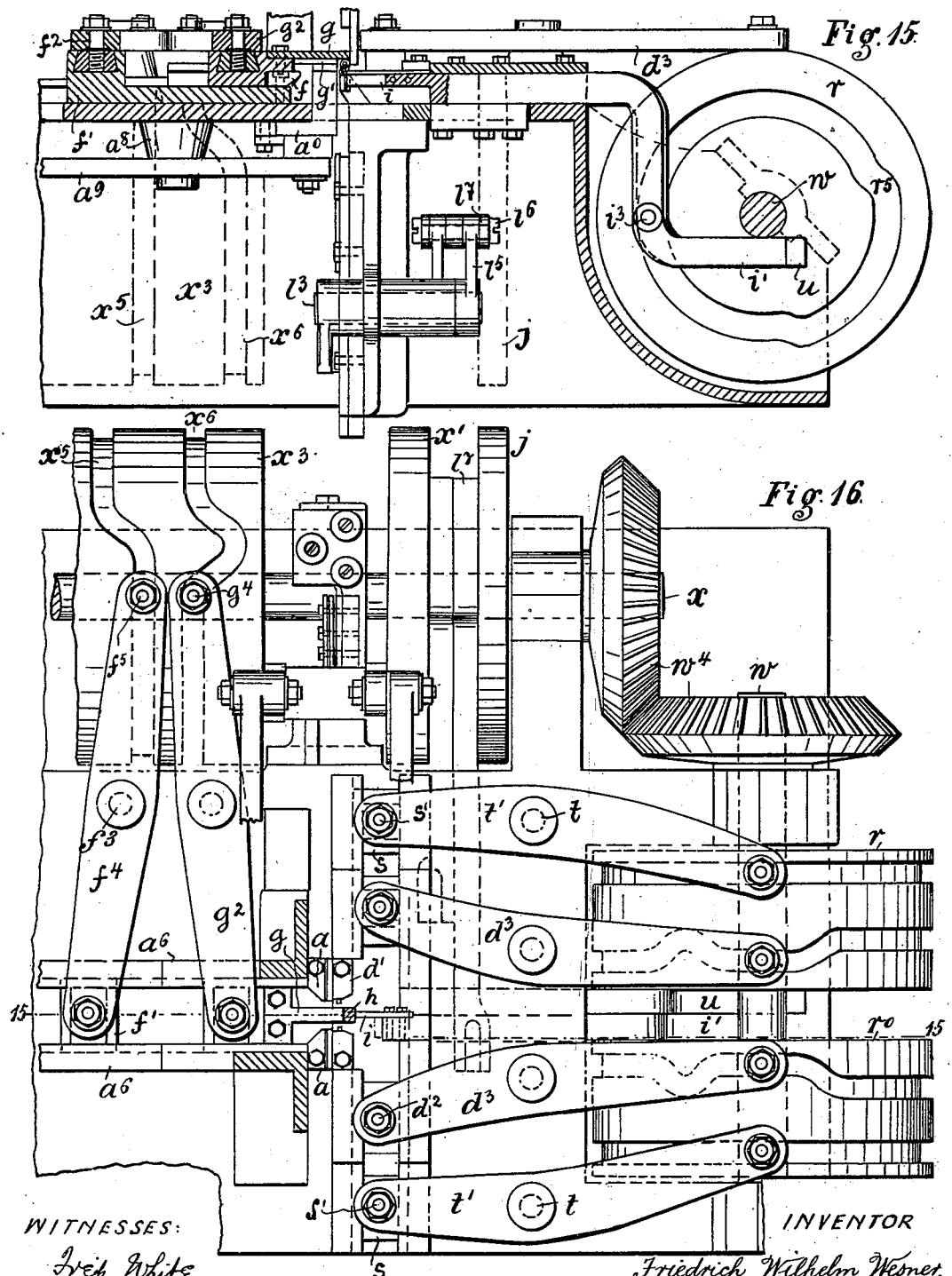
Figure 17:
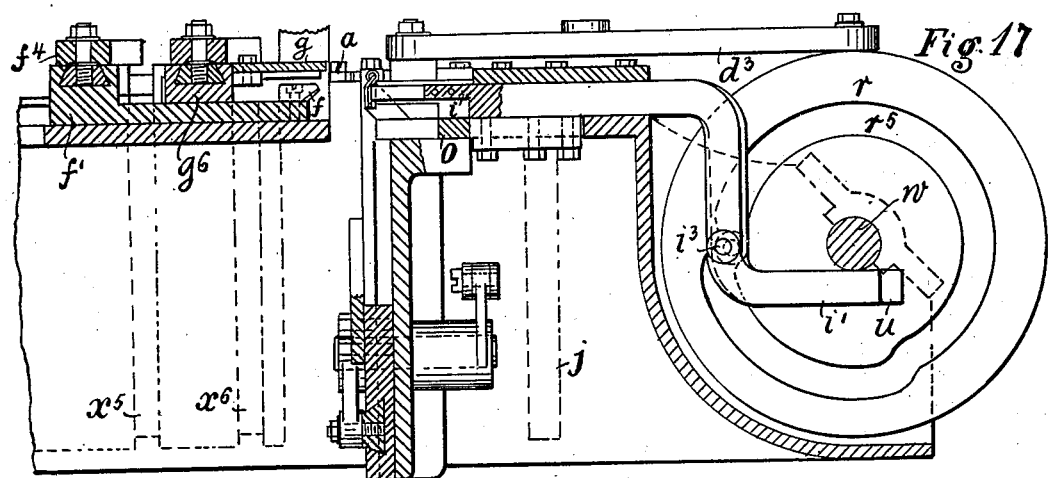
Figure 18:
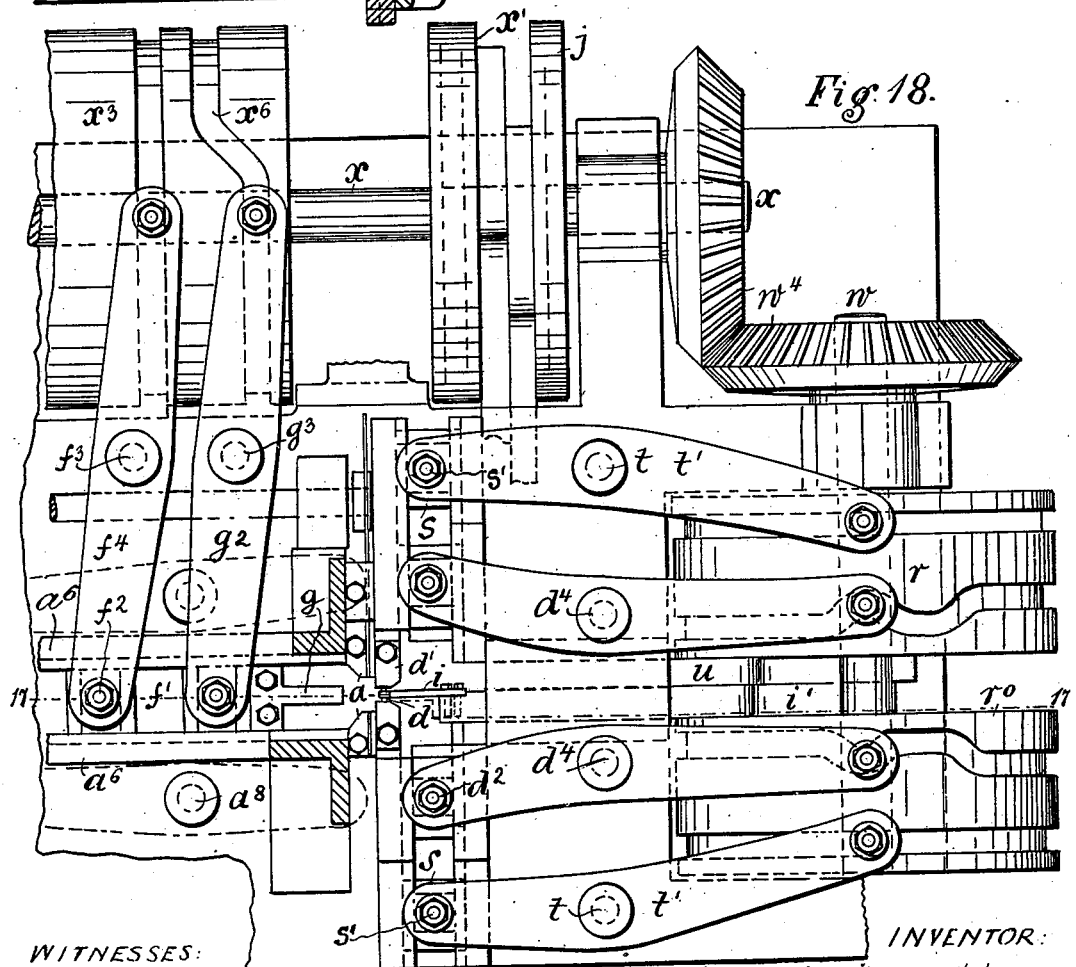

Referring to the accompanying drawings, Figure 1 shows a side view of part of the machine, partly in section, with the mechanisms in the position for performing the first bending operation. Fig. 2 shows a plan view of the same. Fig. 3 shows a side view in part of the working parts during the second bending operation. Fig. 4 shows a plan view of the same. Fig. 5 shows an elevation, and Fig. 6 a plan view, partly in section, during the third bending operation. Fig. 7 shows an elevation, and Fig. 8 a plan view, partly in section, with the working parts in the position for the fourth bending operation. Fig. 9 shows an elevation, and Fig. 10 a plan view, partly in section, with the mechanisms in the position for performing the fifth bending operation. Fig. 11 shows an elevation, and Fig. 12 a plan view, partly in section, with the mechanisms in the position for performing the sixth bending operation. Fig. 13 shows an elevation, and Fig. 14 a plan view, partly in section, illustrating the position of the parts during the seventh bending operation. Fig. 15 shows an elevation, and Fig. 16 a plan view of the mechanisms, partly in section, during the eighth bending operation. Fig. 17 shows an elevation, and Fig. 18 a plan view, partly in section, of the mechanisms during the final bending operation. Fig. 19 shows an elevation, and Fig. 20 a plan view, partly in section, of the mechanisms during the feeding of a new section of wire. Fig. 19ª shows a detail of the mechanisms for performing the first bending operation. Figs. 21 to 27 show the successive steps of the operation of forming the link. Fig. 28 shows a plan view of the complete machine. Fig. 29 shows a side view, and Fig. 30 an end view, of the same. Fig. 31 is a detail illustrating a device for moving back the clamps. Fig. 32 is an enlarged view of a portion of Fig. 3, showing a detail.

The wire to be bent is fed into the guide-grooves of the two opposing parts $a$ in such a manner that the middle of a suitable length of the wire comes to rest in the center of the space between the two grooves. After the wire has been cut into such length by the cutting apparatus a die $b$ descends upon the wire, the width of which corresponds in size to the inner diameter of the loop to be formed, practically of the double thickness of the wire. This die at first bends the wire in a slight curve downward. By the further downward movement of the die $b$ the legs of the wire are pressed against two cheeks $c$, moving against each other, Figs. 1 and 2, thereby narrowing the curve. At the same time that the die $b$ moves downward the two cheeks $c$ have closed so far that the wire is laid exactly around the die $b$. The two cheeks $c$ are grooved in such a manner that they inclose the wire. The cheeks $c$ are fixed to two carriers $q$ moving in opposite directions, each of which connects with a slide $s$ by means of a square attachment $p$. The slot in the slide $s$ which the attachment $p$ engages is elongated for a purpose hereinafter stated. The slides $s$ connect by means of pins $s'$ with levers $t'$, pivoted to the frame of the machine at $t$, which levers engage in the grooves $r'$ and $r^2$ of the disks $r^0$ and $r$ by means of pins $t^2$, fixed at their extreme ends. The axle $w$ of these disks is operatively connected by means of the gear $w'$ to the driving-shaft $w^2$, which is constantly rotated by a pulley $w^3$, or in any other suitable manner. Owing to the rotation of the disks $r$ the levers $t'$ oscillate outwardly, whereby the slides $s$ move toward each other and the cheeks $c$ are thus actuated in the manner described. The operation of the slide $b'$, carrying the die $b$, is derived from the disk $x'$, mounted on the shaft $x$, said disk being provided with a groove $x^2$, which engages a pin $b^3$, fixed to the end of the lever $b^2$. This lever $b^2$ is pivoted to the frame of the machine at $b^4$ and connects at its other end by means of a rod $b^5$ with an arm $b^6$, supported by a spindle $b^8$, which also carries a second arm $b^7$. The free end of this arm $b^7$ is pivoted to the slide, which is suitably guided by the frame, so that the die $b$ derives the necessary motion from the rotary motion of the shaft $x$, carrying the disk $x'$.

The shaft $x$ is rotated by the shaft $w$ by means of the beveled gear $w^4$. These two beveled gears are of the same size, so that each revolution of shaft $w$ causes one revolution of shaft $x$.

The arrangement of the two cheeks is the first important part of my invention, as through the gradually-proceeding process of manufacture a stronger wire may be used without its suffering any scraping or other damage. The sides of the wire loop are thereby also formed more nearly parallel to each other—that is to say, they lie more nearly in the same plane than possible when formed by means of a simple hollowed-out bending-tool, as used heretofore. It is also possible by the above-mentioned process to obtain a small and exactly-defined shape of the loop. The three other advantages hereinafter described—namely, the pressing on of the finished link, the automatic removal of the chain, and the possibility of manufacturing chain-links of desired length—are also due to the arrangement of the cheeks $c$.

After the first bending operation the parts $a$, (provided with grooves,) which are hollowed out in such a manner that they can bend inwardly the protruding parts of wire on top just over the die $b$, move toward each other, Figs. 3, 4, and 22. The die $b$ is provided with suitable guiding parts, (even a simple screw-pin, such as is shown at $b''$ in Fig. 22, suffices,) which make it impossible that the ends should cross or lap over each other. The operation of the cheeks $a$ is effected by the disk $x^3$, mounted upon the shaft $x$, the pin $a^2$, fixed at the end of the lever $a'$, engaging in the groove $x^4$ of said disk $x^3$. The lever $a'$ is pivoted to the frame at $a^3$ and connects at its other end by means of the pin $a^4$ with two rods $a^5$, acting as elbow-levers, said pin $a^4$ being fixed to a slide $a^7$, arranged between the guides $a^6$. The rods $a^5$ are connected to levers $a^9$, pivoted to the frame at $a^8$, which levers engage at their free ends with the slides $a^0$, carrying the cheeks $a$. Thus when the shaft $x$ rotates the cheeks are moved toward each other by means of the system of levers $a'$ $a^5$ $a^9$, so that the cheeks effect the bending of the U-shaped wire over the die $b$. This process is the second important part of the invention, as by it the eyes formed afterward must necessarily lie close together in the bends, where the windings of the eyes or final loops are situated, whereby the link at the final loop receives a uniform breadth equal to the fourfold thickness of the wire. In chains made on previous machines the link had in the final loops a breadth which was equal to the sixfold thickness of the wire. For this reason alone the links of such chains must be six times the breadth of the diameter of the wire, as otherwise the already free outer winding of the final loop would lap over entirely. The parts $a$ are moved back and the cheeks $c$ move out of the position indicated in Fig. 4 in the direction toward the position shown in Fig. 6. During this operation the wire loop is drawn from die $b$, which ascends to make room for the bending-die $f$. In the meantime two slides provided with iron pins $d$ have been moved toward each other (see Fig. 4) in such a manner that the pins $d$ take their position before the wire loop over its bend. This motion is also imparted by the disks $r$, mounted upon the shaft $w$, the grooves $r^3$ and $r^4$ of said disks engaging the pins $d^5$ of the double levers $d^3$, pivoted to the frame at $d^4$. The other arms of these levers $d^3$ connect by means of the pins $d^2$ with the slides $d'$, carrying the pins $d$. The grooves $r^3$ and $r^4$ are so formed that the pins $d$ are brought together before the movement of the cheeks in the direction of the arrow A, Fig. 5, and B, Fig. 6. The cheeks $c$, which now alone hold the wire loop, are moved into position Fig. 5, and said bending-die $f$ moves forward in such a manner that at the wire loops it effects a lateral bend of the legs of the loop under the counteraction of the iron pins $d$, as shown in Figs. 5 and 23. The movement of the cheeks $c$ in the direction of the arrows A and B is derived from the disk $r$, provided with the groove $r^5$, into which the pin $u'$ of the rod $u$ is engaged. This rod is provided at its end with a frame $o$, surrounding the before-mentioned carriers $q$ of the cheeks $c$. When the disk $r$ turns, the rod $u$ is displaced and the cheeks $c$, with the loop of wire, are brought in the position shown in Fig. 5. The bending-die $f$ is fixed on a slide $f'$, moving between the guides $a^6$, which slide connects, by means of pin $f^2$, with one end of the lever $f^4$, pivoted at $f^3$, and the other end of said lever carries a pin $f^5$, engaged in the groove $x^5$ of the disk $x$.[3] By this mechanism the bending-die $f$ is brought to the position Figs. 5 and 6, together with the cheeks $c$. During the fourth bending operation a horizontally-moving bending-die $g$ moves forward, bending the legs of the wire, which are thereby turned upward around the iron pins $d$, so that they are placed in a horizontal line. (See Figs. 7, 8, and 24.) The movement of this die is also derived from disk $x^3$, the groove $x^6$ of which engages the pin $g^4$ of the lever $g^2$, pivoted at $g^3$. This lever connects by a second pin $g^5$ with the supporting-slide $g^6$ of the die $g$. The groove $x^6$ is so formed that the die $g$ is advanced at the proper time. For carrying out the fifth bending operation a perpendicular die $h$ is moved downward, which bends the legs down. (See Figs. 9, 10, and 25.) The supporting-slide $h'$ of this die $h$, moving between the guides $h^2$, connects by means of pin $h^4$ with the arm $h^3$, which is supported on a spindle $h^6$, also carrying a second arm $h^5$. The arm $h^5$ is connected by the rod $h^7$ with the lever $h^9$ pivoted at $h^8$, and the pin $h^0$ of this lever $h^9$, is engaged in the groove $x^7$ of the disk $x^3$. This groove causes the lever $h^9$ to oscillate outward at the proper time, whereby the die $h$ is moved downward by the mechanism described, and the ends of the wire are bent downwardly. A movable die $i$, which runs between the cheeks $c$ in the direction of the wire loop, now comes close to the half-finished link and bends the wire ends further in a horizontal direction. (See Fig. 11.) The die $i$ is fixed to a suitably-moving bent rod $l'$, provided with a lateral pin $i^3$, engaged in the groove $i^2$ of the disk $r^0$. This groove $i^2$ is so formed that the die $i$ is advanced at the proper moment to bend the ends of the wire inwardly, thus accomplishing the sixth bending operation. During this process the ends meet die $f$, which at its front is wedge-shaped in such form that in pressing against the ends of the wire legs it separates them. (See Figs. 11 and 26.) When this is accomplished, the bending-dies $f$ and $g$ move backward, and from below rises a die $l$, which bends the outward-turned ends upward, while the slides $d'$, carrying the iron pins $d$, move out of their prior positions in proper time, so that the eyes find their only support against the side parts of die $h$. The die $l$, Figs. 13 and 14, is fixed to the slide $l^2$, moving between the guides $l'$, to which slide is pivoted the arm $l^4$, supported by the shaft $l^3$. This shaft, which is supported by the frame, carries a second arm $l^5$, connecting at its end through a pin $l^6$ with the bifurcated end of the bent and suitably-moving rod $l^7$. The pin $l^8$ of the rod $l^7$ engages in a groove $j'$ of the disk $j$, mounted on the shaft $x$, whereby the rod $l^7$ is advanced at the proper moment and the die $l$ is moved upward by the arms $l^5\,l^4$, thus accomplishing the seventh bending operation. Having accomplished its work, die $l$ moves back, when die $g$, which at its lower end carries two attachments $g'$, is again brought into action in such a manner that the attachments bend the ends of the wire, so that the outer points are bent opposite to the center line of the eyes, Figs. 15 and 16. After this process, which constitutes the eighth bending operation, the dies $g$ and $h$ are moved back to their respective positions and the slides $d'$ approach each other, so that the iron pins $d$ press the wire ends, which lie before the eyes, into the latter. (See Figs. 17, 18, and 27.) The link is then completed and a new piece of wire is placed into the grooves $a$, after the cheeks $c$ have gone into their place, Figs. 4 and 20, so that the newly-introduced piece of wire is pulled through the eyes of the finished link, Fig. 19. This accomplished, the cheeks $c$ give the link a short sharp pressure, and then leaving it free they go back to their original positions, (see Figs. 1 and 2,) so that the die $b$ can come into action again, while the other processes follow in due course, as hereinbefore described. By the last pressure of the cheeks $c$ the loop is pressed a little—as much only as the expansion was which took place when removing the loop from the cheeks $c$. Die $b$ is hollowed out at its lower end in such a manner that it can take up the wire-windings of the chain-eyes. (See Fig. 19.) In Figs. 1 and 2 this hollow part is not shown, so as not to confuse the understanding of the primary action of the machine.

In forming the above-described eyes the wire is bent around the abrupt bends which were produced in the second bending operation, whereby the two inner parts of the loop thus produced quite fill up the space under the bends, and whereby when the chain is pulled tight these bends find a safe support, and whereby also any movement of the chain-link in consequence of overstrain is avoided. This result is enhanced by the pressing in of the outer wire ends into the eyes, as these ends fill out the angle produced at the lower part of the eyes and press the bends between themselves and the opposite part of the wire-winding. By this means the advantage is gained that the chain-links always have a uniform appearance, even if the wire pieces should show small differences in length, in consequence of which the ends of the wire in the finished chain-link protrude more or less deeply into the eyes. This is the third important part of the invention.

In the machines in use up to the present time a uniform feed of the wire to the machine for the purpose of making a proper final knot was necessary, as the slightest deviation in the diameter of the wire caused a different knot, thus necessitating a continual and careful watching of the machine—that is, in the regulation of the feed. A surveillance of the work done by the hereinbefore-described machine is unnecessary. Even if the wire-supply should be stopped the machine cannot be damaged, as the finished chain or the finished link falls to the floor by its own weight as soon as the cheeks c have opened, and the machine can run simply without any harm being done.

In the machines used up to the present the finished link can only fall out of the bending-head when the wire for the second links is already introduced into the eyes. If this is not done, the link remains in the bending-head and the machine must at once be stopped, as otherwise injuries to the machine will result or at least a breakage or displacement of the tools will take place.

The above-mentioned cheeks c carry out a double action. For the one part they must approach each other to move out of the position shown in Figs. 1 and 2 into the position shown in Figs. 3 and 4, and on the other hand they must move at right angles to the first movement for the purpose of passing from the position shown in Fig. 4 into that shown in Fig. 6 and back into that shown in Fig. 20. The first-mentioned movement is effected by the disk r, geared onto spindle w, which imparts to the lever t', movably fixed at t, a temporary oscillating motion. (See Figs. 28 and 30.) The other ends of these levers are each connected with a laterally-movable slide s, which, with the aid of cross-slot s', engages the attachment p of the cheek-carriers q, as a result of which with the oscillating movement of the lever t' the cheek-carriers q, and with them the firmly-fixed cheeks c, approach or retreat from each other, as the case may be. The cheek-carriers q are incased in a frame o in such a manner that they can approach each other inside of this frame, but cannot move at a right angle to this first movement. The frame o, however, can move the cheek-carriers q in a rectangular movement by means of the slot s' and engaging attachment p', working therein, without hindering the movement which is transmitted by lever t'. Frame o is connected with the rod u, which can be displaced longitudinally by means of the disk v, geared onto spindle w. This mechanism gives the cheeks their second movement.

A chain of the character herein shown and described is covered by my application, Serial No. 689,712, filed August 27, 1898.

I claim as my invention—

1. A machine for making chain-links from wire, comprising a die moving perpendicularly to the wire for bending the wire into U shape, two cheeks adapted to move toward each other, which press the legs of the U-shaped wire together above the perpendicularly-moving die in such manner that the wire legs lie close together, and means for subsequently bending these legs into eyes.

2. A machine for making chain-links from wire, comprising dies for initially bending the wire into U shape, comprising an inner die having a cross-section which corresponds to the inner open space of a link of the finished chain, and two cheeks having grooves for holding the wire, movable toward said inner die to flatten the wire loop against it, and a pair of cheeks adapted to approach each other beyond said loop and bend the wire exactly around the inner die.

3. A machine for making links from wire, comprising dies for bending the wire to U shape, dies for then forcing the legs thereof abruptly toward each other, dies for forming the eyes, and dies for finally turning the ends of the wire into the eyes, and means for actuating said several dies in the order named.

4. In a machine for making chain-links from wire, the combination of lateral dies or cheeks movable toward each other to bend the wire to U shape and dies for subsequently bending the legs of the U-shaped wire into eyes, said cheeks having a secondary movement at right angles to their initial movement toward each other, adapted to bring the wire against the eye-bending dies to start the bending of the eyes, and means for actuating said cheeks to impart to them such double movement.

5. A machine for making links from wire, comprising dies for bending the wire to U shape, dies for then forcing the legs thereof abruptly toward each other, dies for subsequently forming the eyes, and dies for finally turning the ends of the wire into the eyes, and means for actuating said several dies to act upon the wire in the order named.

6. In machines for manufacturing wire chains, coacting dies $a$, $b$, $c$, $d$, $f$, $g$, $h$, $i$, and $l$, the dies $a$, $b$, and $c$ coacting to bend the wire blank to U shape and to form abrupt shoulders upon the legs thereof, the dies $a$, $c$, $d$, and $f$, bending the legs backwardly and upwardly to start the bending of the eyes, the dies $g$ and $d$ bending the legs horizontally, the die $h$ bending the legs vertically, the die $i$ passing the legs through the loop, the die $f$ spreading the legs, the die $l$ bending the legs vertically around the abrupt shoulders, the die $g$ bending the ends of the wire to points opposite the eyes, and the die $d$ bending the ends of the wire into the eyes, in combination with means for actuating such dies to act upon the wire in the manner described.

7. A machine for making links from wire, comprising dies for bending the wire to U shape, dies for forming the eyes, and dies for turning the ends of the wire into the eyes.

In testimony whereof I affix my signature in presence of two witnesses.

FRIEDRICH WILHELM WESNER.

Witnesses:
HENRY HASPER,
W. HAUPT.